United States Patent [19]

Matsuhiro et al.

[11] Patent Number: 4,640,903

[45] Date of Patent: *Feb. 3, 1987

[54] SILICON NITRIDE SINTERED BODIES AND A METHOD FOR PRODUCING THE SAME

[75] Inventors: Keiji Matsuhiro; Minoru Matsui, both of Nagoya, Japan

[73] Assignee: NGK Insulators, Ltd., Japan

[*] Notice: The portion of the term of this patent subsequent to Dec. 10, 2002 has been disclaimed.

[21] Appl. No.: 776,456

[22] Filed: Sep. 16, 1985

Related U.S. Application Data

[63] Continuation-in-part of Ser. No. 502,288, Jun. 8, 1983, Pat. No. 4,558,018.

[30] Foreign Application Priority Data

Apr. 4, 1983 [JP] Japan .................................. 58-57915

[51] Int. Cl.$^4$ ............................................. C04B 35/58
[52] U.S. Cl. ........................................ 501/97; 264/65; 501/98
[58] Field of Search ...................... 501/97, 98; 264/65

[56] References Cited

U.S. PATENT DOCUMENTS

| | | | |
|---|---|---|---|
| 3,839,540 | 10/1974 | Arrol | 501/97 |
| 4,025,351 | 5/1977 | Masaki | 501/98 |
| 4,073,845 | 2/1978 | Buljan et al. | 264/65 |
| 4,099,979 | 7/1978 | Lange et al. | 501/97 |
| 4,143,107 | 3/1979 | Ishii et al. | 264/65 |
| 4,264,547 | 4/1981 | de Pous | 264/65 |
| 4,280,973 | 7/1981 | Moskowitz et al. | 264/65 |
| 4,443,394 | 4/1984 | Ezis | 264/65 |

FOREIGN PATENT DOCUMENTS 56-149378 11/1981 Japan .................................. 501/97

OTHER PUBLICATIONS

Jack, K. H., "Phase Assemblages in Nitrogen Ceramics and their Relationships with Properties", (1979), pp. 295-305.

Lange, F. F., "Silicon Nitride Polyphase Systems: Fabrication, Microstructure, and Properties"—International Metals Review, 1980, No. 1.

Primary Examiner—Helen M. McCarthy
Attorney, Agent, or Firm—Parkhurst & Oliff

[57] ABSTRACT

Silicon nitride sintered bodies having particularly excellent strength and creep resistance at high temperature, in which a total amount of MgO and $Al_2O_3$ is more than 7% by weight and not more than 30% by weight and a weight ratio of $MgO/Al_2O_3$ is 5–15 and the remainder is mainly $Si_3N_4$ and at least one of magnesium sialon crystal represented by the general formula $Mg_{x/2}Si_{6-y+x-}$ $/2Al_{y-x}O_yN_{8-y}$ ($0 < x \leq y < 8$, preferably $0.9 \leq x/y$) and forsterite crystal represented by the formula $Mg_2SiO_4$ is contained as a second phase in addition to the main crystal of $Si_3N_4$, are produced by mixing a raw material powder of silicon nitride containing not greater than 2% by weight of oxygen with MgO and $Al_2O_3$ so that a total amount of MgO and $Al_2O_3$ is from 7% by weight to 30% by weight and a weight ratio of $MgO/Al_2O_3$ is 5–15, and firing the resulting mixture at a temperature of 1,650°–1,850° C. in nitrogen or an inert gas atmosphere.

4 Claims, 4 Drawing Figures

— 4,640,903 —

SILICON NITRIDE SINTERED BODIES AND A METHOD FOR PRODUCING THE SAME

CROSS REFERENCE TO RELATED APPLICATION

This application is a continuation-in-part of application Ser. No. 502,288 filed June 8, 1983, U.S. Pat. No. 4,558,018.

BACKGROUND OF THE INVENTION

1. Field of the Invention

The present invention relates to silicon nitride sintered bodies having particularly excellent strength and creep resistance at high temperature and a method for producing the same.

2. Description of the Prior Art

In general, silicon nitride sintered bodies have superior mechanical properties at relatively high temperatures as compared to metals, so that these bodies have generated particular interest as structural materials for gas turbine parts, adiabatic engine parts, ball bearings for high temperature, parts for various high temperature furnaces and the like, which operate at high temperatures.

For the production of silicon nitride sintered bodies, the following processes have been used.

For example, to silicon nitride powder is added a sintering aid selected from the group consisting of $MgO$, $Al_2O_3$, $Y_2O_3$, $CeO_2$ and the like and the resulting mixture is sintered under an ambient or a high pressure non-oxidizing atmosphere.

O. de Pous discloses in U.S. Pat. No. 4,264,547 a method for improving the strength at high temperature of a silicon nitride sintered body containing $Al_2O_3$ and $MgO$ in a composition shown in FIG. 2 of this specification by decreasing the amount of its grain boundary phase.

A shaped body of Si powder is fired under nitrogen gas (reaction bonding process).

Alternatively, Si powder is mixed with a sintering aid, such as $MgO$, $Al_2O_3$, $Y_2O_3$ and the like and the resulting mixture is formed into a shaped body and then the shaped body is nitrided in nitrogen gas, after which the shaped body is additionally sintered at a high temperature under an ambient or a high pressure non-oxidizing atmosphere.

However, among the prior silicon nitride sintered bodies, when the silicon nitride sintered body parts obtained by the sintering process under ambient pressure, are used at a high temperature of about 1,400° C., such parts have a very poor durability because of the deficiency of the strength at high temperature. The sintered bodies obtained by sintering under high pressure, that is a hot press process or a hot isostatic press process, are very difficult to produce and have excessive manufacturing cost in the production of large articles, complicated shapes or mass production of articles.

SUMMARY OF THE INVENTION

The present invention aims to obviate these prior defects and to obtain silicon nitride sintered bodies having excellent strength and creep resistance at high temperature and a method for producing cheaply and easily silicon nitride sintered bodies through a sintering process under ambient pressure.

The present invention has found that quite novel silicon nitride sintered bodies having excellent strength and creep resistance at high temperature, which consist mainly of crystalline $Si_3N_4$ and contain at least one of crystalline magnesium sialon crystal and forsterite as the second phase, are obtained by sintering a mixture of $Si_3N_4$, $MgO$ and $Al_2O_3$ in a specific ratio in nitrogen or in an inert gas atmosphere under ambient pressure.

That is, the present invention lies in silicon nitride sintered bodies which contain $MgO$ and $Al_2O_3$ in a total amount of more than 7% by weight and not more than 30% by weight and a weight ratio of $MgO/Al_2O_3$ is within the range of 5-15, and has an oxygen content of not greater than 2% by weight, said oxygen content being exclusive of the amount contained in the $MgO$ and $Al_2O_3$, wherein at least one of crystalline magnesium sialon represented by the general formula $Mg_{x/2}Si_{6-y+x/2}Al_{y-x}O_yN_{8-y}$ ($0 < x \leq y < 8$, $x/y = 2R/(1+2R)$, wherein R is a molar ratio of Mg/Al, and preferably $0.9 \leq x/y < 1$) and crystalline forsterite crystal represented by the formula $Mg_2SiO_4$ is contained as a second phase in addition to the main crystalline phase of $Si_3N_4$.

Chemically, the silicon nitride sintered body contains $MgO$ and $Al_2O_3$ in a total amount of more than 7% by weight and not more than 30% by weight and in a weight ratio is within a range of $MgO/Al_2O_3$ of 5-15.

DESCRIPTION OF THE PREFERRED EMBODIMENTS

Silicon nitride sintered bodies of the present invention will be explained in more detail.

Figure 1:
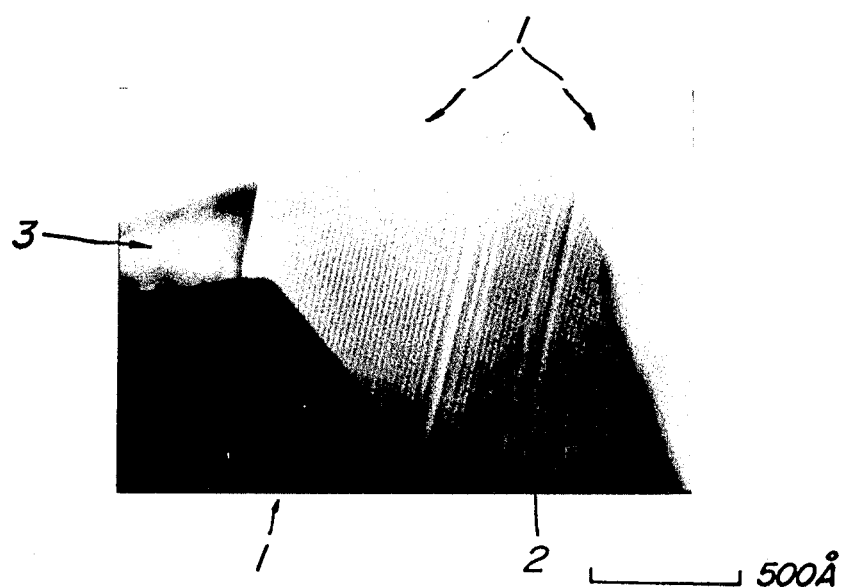
FIG. 1 is a typical microstructure of Sample No. 7 of the present invention which is observed by a transmission electron microscope.

FIG. 1 shows the microstructure of the present invention which is observed by a transmission electron microscope, in which 1 represents crystalline $Si_3N_4$, 2 represents crystalline magnesium sialon and 3 represents crystalline forsterite. No glass is found at the boundary of the crystalline phases and it can be seen that the crystals are strongly bonded with one another. When the contents of Mg and Al in crystalline magnesium sialon are respectively analyzed from each X-ray intensity and the ratio of x to y in the general formula $Mg_{x/2}Si_{6-y+x/2}Al_{y-x}O_yN_{8-y}$ is calculated therefrom, said ratio is more than 0.90.

As mentioned above, in the microstructure of the sintered body of the present invention, the grain boundary of crystalline $Si_3N_4$ of the main component is constructed with crystalline magnesium sialon and crystalline forsterite as the second phase and crystalline the crystal grain boundary of $Si_3N_4$ is substantially completely crystallized into the second phase of crystalline magnesium sialon crystalline forsterite and the like, whereby the sintered body of the present invention has excellent strength and creep resistance at high temperatures.

In general, Si₄N₄ has a very poor sinterability. Therefore, in order to obtain a dense sintered body under ambient pressure, it is necessary to add a substance which promotes densification of Si₃N₄, such as a sintering aid which forms a liquid phase during the densification. Such a substance becomes a liquid phase at the initial stages of sintering and serves a very effective role for densifying Si₃N₄. However, after sintering has been completed, said substance remains as a glass in the crystalline grain boundaries resulting in a lowering of the strength of the sintered body at high temperatures.

However, the sintered bodies containing MgO and Al₂O₃ of the limited composition of the present invention form a liquid phase consisting of Si, Mg, Al, O and N at the initial stage of sintering and the densification of Si₃N₄ is promoted in the aid of this liquid phase and the density of the sintered bodies is improved. The major portion of the finally formed liquid phase is crystallized into magnesium sialon crystals and/or forsterite crystals and the amount of glass remaining is very small.

The migration rate of the component ion of magnesium sialon crystals, forsterite crystals and the like are far lower than that of glass, so that even when stress is applied at high temperatures, plastic deformation does not extensively occur. Therefore, the sintered bodies of the present invention which contain these crystals in the crystalline grain boundaries of Si₃N₄ crystals and have substantially no glass present, have unexpectedly improved strength and creep resistance at high temperatures.

The sintered bodies of the present invention consist of 93-65% by weight of crystalline Si₃N₄, 25-0.1% by weight of crystalline magnesium sialon and/or 15-0.1% by weight of crystalline forsterite and less than 1% by weight of glass and have a relative density of more than 95%, so that the strength and creep resistance at high temperatures are excellent.

Accordingly, it is very important that the total amount of MgO and Al₂O₃ is greater than 7% by weight and not greater than 30% by weight. When said total is less than 7% by weight, the densification of the sintered body is not satisfied and the relative density is low and a practically useful strength cannot be obtained. While when said amount exceeds 30% by weight, the above described second phase is not satisfactorily crystallized and the amount of residual glass increases and the strength at high temperatures is reduced and such an amount is not preferable.

The reason why the weight ratio of MgO/Al₂O₃ is 5-15, is based on that when said ratio is less than 5 or more than 15, the crystallization of the second phase is insufficient and said second phase remains in the form of glass and high strengths at high temperatures cannot be obtained.

The oxygen content in the silicon nitride sintered body must be not greater than 2% by weight, which content is exclusive of the amount of oxygen due to the addition of MgO and Al₂O₃ to the raw material of silicon nitride. This oxygen is mainly due to SiO₂ contained in the raw material of silicon nitride or due to the oxidation of Si₃N₄ during the steps of mixing, pulverization, drying, shaping and the like. The amount of oxygen sometimes decreases during firing of the body. When the oxygen content in the silicon nitride sintered body, which content is exclusive of the amount of oxygen due to the addition of MgO and Al₂O₃ to the raw material of silicon nitride, exceeds 2% by weight, the crystallization of the second phase is insufficient and said phase remains in the form of glass and high strengths at high temperatures cannot be obtained.

The reason why the ratio of x to y in the composition of crystalline magnesium sialon represented by the general formula $Mg_{x/2}Si_{6-y+x/2}Al_{y-x}O_yN_{8-y}$ ($0 < x \leq y < 8$) is equal to or larger than 0.9 but does not exceed 1, is based on that, when x/y is less than 0.9, the stability of magnesium sialon crystals and forsterite crystals is not satisfied and these crystals are readily glassified at high temperature.

The relative density of the sintered bodies of higher than 95% and the four point flexural strength at 1,400° C. in air being higher than 30 kg/mm² are defined in order to satisfy the properties having substantially no open pores and a practically useful strength at high temperatures which are necessary for materials used as mechanical parts at high temperatures.

Figure 2:
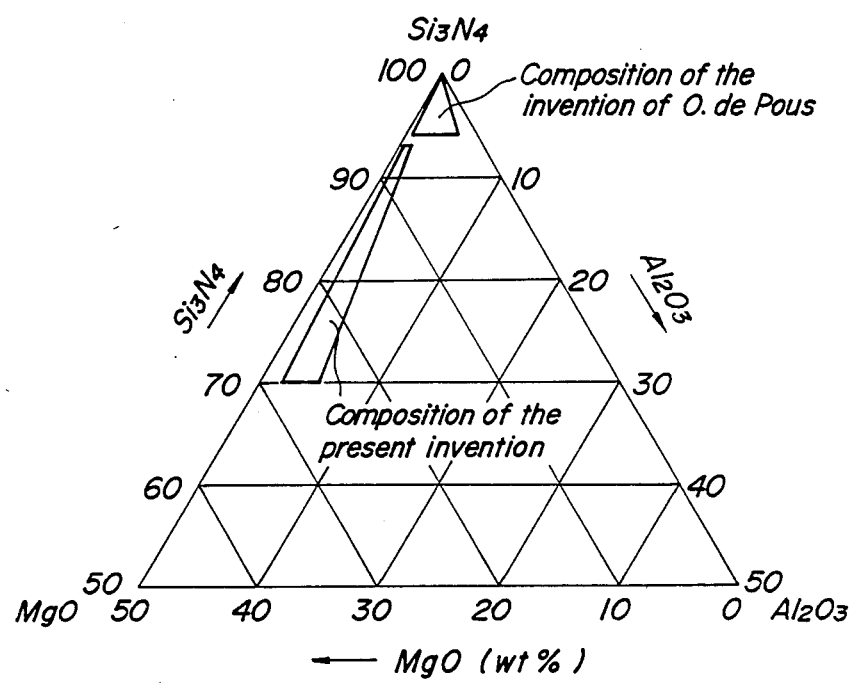
FIG. 2 is a ternary diagram showing the composition limit range of the present invention.

FIG. 2 shows the ternary diagram limiting the composition of the present invention.

Figure 3:
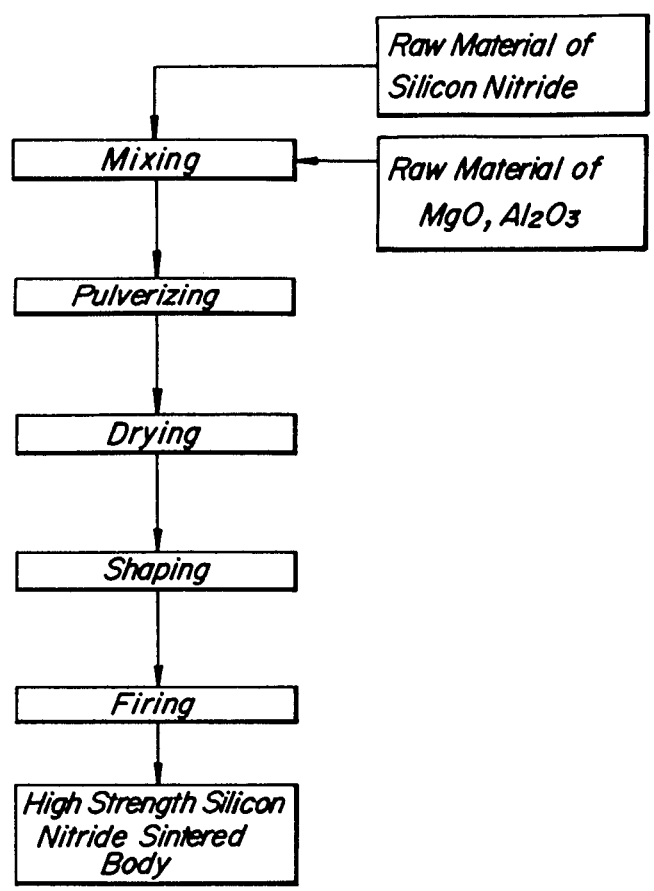
FIG. 3 is a block diagram of the method for producing silicon nitride sintered bodies according to the present invention.

The method for producing silicon nitride sintered bodies of the present invention is explained hereinafter in detail with reference to the block diagram shown in FIG. 3. To a raw material powder of silicon nitride having high purity, which contains not greater than 2% by weight, preferably not greater than 1.5% by weight of oxygen are added MgO and Al₂O₃ powders having high purity so that the total amount of MgO and Al₂O₃ is from 7% by weight to 30% by weight and the weight ratio of MgO/Al₂O₃ is 5-15. The resulting mixture is pulverized by a rotary mill, a vibratory mill, attrition mill and the like. The pulverizing step may be carried out by any of wet process and dry process but in order to prevent the oxidation of Si₃N₄ as far as possible, the pulverizing medium may be benzene, xylene, ether and the like and it is further preferable that the vessel is filled with nitrogen gas.

The mixture is pulverized until it is thoroughly finely divided and then taken out from the vessel and dried and then the pulverized particles are granulated to obtain powder for shaping. In this case, if necessary, a shaping aid, such as polyvinyl alcohol and the like, which is a temporary thickener, may be added. This shaping powder is formed into desired shapes through hydrostatic press molding, extruding, injection molding and the like and then fired in nitrogen or an inert gas under ambient pressure. The firing temperature is 1,650°-1,850° C., preferably 1,700°-1,750° C. for 0.2-2 hours.

The raw material powder of silicon nitride used in the present invention is preferred to be ones in which the total amount of metal impurities is less than 1% by weight, the content of α-Si₃N₄ is more than 80% by weight, preferably more than 90% by weight, a BET specific surface area is 5-50 m²/g, preferably 7-20 m²/g and the average grain size is less than 5 μm, preferably less than 2 μm. MgO and Al₂O₃ are particularly preferable to have a purity of more than 99% by weight, the average grain size of less than 5 μm and a BET specific surface area of 5-50 m²/g. However, any material which can form MgO and Al₂O₃ through firing may be used, and for example, a hydrolyzate of alkoxide or a hydrate of an alloy which has been adjusted in the given MgO/Al₂O₃ ratio may be used.

In the method for producing the sintered bodies of the present invention, it is most important that the oxygen content of the raw material powder of silicon nitride is not greater than 2% by weight and when said content exceeds 2% by weight, a substance consisting of MgO—Al$_2$O$_3$—SiO$_2$ ternary systems and having a low melting point is formed. This prevents the formation of crystalline magnesium sialon and crystalline forsterite crystal and the strength at high temperatures is deteriorated. The definition of the firing temperature of 1,650°-1,850° C. is based on the following reason. When the temperature is lower than 1,650° C., the sintering does not proceed satisfactorily and the density of the sintered bodies is low, while when the temperature exceeds 1,850° C., Si$_3$N$_4$ is decomposed and evaporates.

The total amount of metal impurities in the raw material powder of silicon nitride is preferred to be less than 1% by weight, because when the total amount of Fe, Ti, Ca, Na, K and the like, which are metal impurities, exceeds 1% by weight, these impurities react with Si$_3$N$_4$, MgO, Al$_2$O$_3$ and an amount of glass having a low melting point increases resulting in a reduction of the high temperature strength of the sintered bodies.

The definition of the content of α-Si$_3$N$_4$ crystal in the raw material powder of silicon nitride being not less than 80% by weight is based on the following reason. When the content of α-Si$_3$N$_4$ crystal in the raw material is less than 80% by weight, the strength of the sintered bodies does not reach a practically useful level. The BET specific surface area of the raw material powder of silicon nitride is preferred to be 2-50 m$^2$/g, because when said specific surface area is less than 2 m$^2$/g, the sinterability is poor and satisfactory densification cannot be obtained. While when said area is greater than 50 m$^2$/g, the cohesive force of the powder becomes strong and the uniform mixing of MgO and Al$_2$O$_3$ powders becomes difficult.

The average grain size is defined to be no greater than 5 μm, because when the average grain size exceeds 5 μm, the sinterability is poor and the satisfactory densification cannot be obtained.

Si$_3$N$_4$ crystals and forsterite crystals in silicon nitride sintered bodies of the present invention are identified by X-ray diffractometry of the powdery materials, crystalline magnesium sialon is identified by the fact that the crystal shows the lattice image inherent to magnesium sialon and contains Mg, Al and Si by the observation through transmission electron microscope provided with X-ray analyzer.

The composition of x/y of crystalline magnesium sialon is determined by the following formula $$x/y = 2R/(1+2R)$$

, wherein R is a molar ratio of Mg/Al in the crystal and is measured by a thin film quantitative analyzing process using Cliff-Lorimer model. The strength means the four point flexural strength following the JIS R-1601 "Testing Method for Flexural Strength (Modulus of Rupture) of High Performance Ceramics" and the creep resistance at high temperature means the creep rate at the 0.3% strain by applying a load of 20 kg/mm$^2$ at 1,200° C. in air under the same condition as in the method for measuring the four point flexural strength.

The following examples are given for the purpose of illustration of this invention and are not intended as limitations thereof.

EXAMPLE 1

To raw material powder of silicon nitride having an oxygen content of 1.4% by weight, a total content of metal impurities of 0.9% by weight, a BET specific surface area of 5.3 m$^2$/g and an average grain size of 3.4 μm were added MgO and Al$_2$O$_3$ powders having a purity of more than 98% by weight, a BET specific surface area of 12 m$^2$/g and an average grain size of 2 μm in the mixing ratio shown in the following Table 1. Further, 500 g of the resulting mixture, 1 kg of nylon coated grinding balls and 1,000 ml of benzene were charged into a plastic vessel having an inner capacity of 2 l and air in the vessel was purged with nitrogen gas and then pulverized by means of a rotary mill at 100 rotations per minute for 300 hours. After finishing the pulverizing, the slurry was dried in nitrogen gas at 90° C. and the dried powder was passed through a sieve having an opening of 300 μm to obtain shaping powder. This powder was pre-shaped under a pressure of 200 kg/cm$^2$ into 60×60×7 (mm) and the pre-shaped body was covered with a rubber bag and subjected to hydrostatic pressing under a pressure of 2.5 ton/cm$^2$. This shaped body was put in a crucible made of graphite having high purity and sintered under ambient pressure in nitrogen gas at firing temperatures described in Table 1 for 30 minutes to obtain silicon nitride sintered bodies of the present invention of Nos. 5-8 and Nos. 20-25.

Comparative sintered bodies (Nos. 1-4 and Nos. 9-19) which were not within the limited composition area of the present invention, were prepared under the same conditions as described above. With respect to these sintered bodies, the relative density, the four point flexural strength, the creep rate in air at 1,200° C., the crystal phase and the like were measured for comparison. The obtained results are shown in Table 1.

The transmission electron micrograph of the silicon nitride sintered body of No. 7 of the present invention is shown in FIG. 1.

Figure 4:
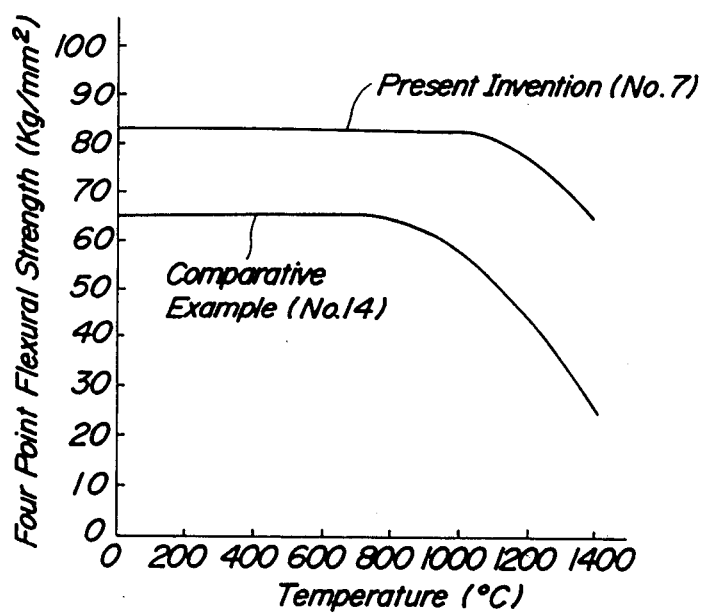
FIG. 4 shows the four point flexural strength from room temperature to 1,400° C. of a silicon nitride sintered body of the present invention and that of a comparative example.

The temperature and the strength of an example of the present invention and a comparative example are shown in FIG. 4.

TABLE 1 (a)

| | Sample No. | Mixing ratio (wt %) | | | MgO + Al$_2$O$_3$ (wt %) | MgO/Al$_2$O$_3$ (weight ratio) | Firing temperature (°C.) | Relative density (%) |
|---|---|---|---|---|---|---|---|---|
| | | Si$_3$N$_4$ | MgO | Al$_2$O$_3$ | | | | |
| Comparative example | 1 | 93.9 | 5.79 | 0.31 | 6.1 | 18.7 | 1,800 | 97.1 |
| | 2 | 80.0 | 19.0 | 1.0 | 20.0 | 19.0 | 1,750 | 97.2 |
| | 3 | 70.0 | 28.5 | 1.5 | 30.0 | 19.0 | 1,750 | 97.8 |
| | 4 | 93.9 | 5.5 | 0.6 | 6.1 | 9.2 | 1,800 | 96.9 |
| Present invention | 5 | 92.0 | 7.0 | 1.0 | 8.0 | 7.0 | 1,750 | 97.0 |
| | 6 | 84.5 | 14.0 | 1.5 | 15.5 | 9.3 | 1,750 | 98.6 |
| | 7 | 80.0 | 18.0 | 2.0 | 20.0 | 9.0 | 1,750 | 98.5 |
| | 8 | 70.0 | 27.0 | 3.0 | 30.0 | 9.0 | 1,750 | 98.0 |
| Comparative example | 9 | 93.9 | 4.9 | 1.2 | 6.1 | 4.1 | 1,850 | 97.5 |
| | 10 | 80.0 | 16.0 | 4.0 | 20.0 | 4.0 | 1,750 | 97.7 |
| | 11 | 70.0 | 24.0 | 6.0 | 30.0 | 4.0 | 1,650 | 97.8 |
| | 12 | 94.0 | 5.8 | 0.2 | 6.0 | 29.0 | 1,750 | 94.0 |
| | 13 | 80.0 | 19.1 | 0.9 | 20.0 | 21.2 | 1,750 | 93.2 |
| | 14 | 68.0 | 30.5 | 1.5 | 32.0 | 20.3 | 1,750 | 94.1 |

TABLE 1 (a)-continued

|  | Sample No. | Mixing ratio (wt %) Si₃N₄ | Mixing ratio (wt %) MgO | Mixing ratio (wt %) Al₂O₃ | MgO + Al₂O₃ (wt %) | MgO/Al₂O₃ (weight ratio) | Firing temperature (°C.) | Relative density (%) |
| --- | --- | --- | --- | --- | --- | --- | --- | --- |
|  | 15 | 68.0 | 29.0 | 3.0 | 32.0 | 9.7 | 1,650 | 94.3 |
|  | 16 | 68.0 | 24.0 | 8.0 | 32.0 | 3.0 | 1,700 | 93.4 |
|  | 17 | 80.0 | 15.0 | 5.0 | 20.0 | 3.0 | 1,750 | 94.2 |
|  | 18 | 94.0 | 4.5 | 1.5 | 6.0 | 3.0 | 1,800 | 91.9 |
|  | 19 | 94.0 | 5.5 | 0.5 | 6.0 | 11.0 | 1,850 | 89.0 |
| Present | 20 | 93.0 | 6.5 | 0.5 | 7.0 | 13.0 | 1,750 | 96.4 |
| invention | 21 | 84.0 | 15.0 | 1.0 | 16.0 | 15.0 | 1,750 | 98.2 |
|  | 22 | 70.0 | 28.1 | 1.9 | 30.0 | 14.8 | 1,750 | 97.5 |
|  | 23 | 92.8 | 6.0 | 1.2 | 7.2 | 5.0 | 1,800 | 96.8 |
|  | 24 | 82.0 | 15.0 | 3.0 | 18.0 | 5.0 | 1,750 | 97.2 |
|  | 25 | 70.0 | 25.0 | 5.0 | 30.0 | 5.0 | 1,800 | 98.1 |

TABLE 1 (b)

|  | Sample No. | Composition of sintered body MgO + Al₂O₃ (wt %) | Composition of sintered body MgO/Al₂O₃ (weight ratio) | Four point flexural strength (kg/mm²) Room temperature | Four point flexural strength (kg/mm²) 1,200° C. | Four point flexural strength (kg/mm²) 1,400° C. | Creep rate (1/hr) 1,200° C. | Crystals in sintered body* |
| --- | --- | --- | --- | --- | --- | --- | --- | --- |
| Comparative | 1 | 6.1 | 18.6 | 73 | 63 | 45 | $6.2 \times 10^{-5}$ | SN, F |
| example | 2 | 20.0 | 18.8 | 75 | 65 | 47 | $4.2 \times 10^{-5}$ | SN, F |
|  | 3 | 30.0 | 18.9 | 74 | 68 | 48 | $3.6 \times 10^{-5}$ | SN, F |
|  | 4 | 6.1 | 9.2 | 77 | 67 | 45 | $6.3 \times 10^{-5}$ | SN, MS, F |
| Present | 5 | 7.9 | 7.0 | 81 | 69 | 55 | $1.1 \times 10^{-5}$ | SN, MS, F |
| invention | 6 | 15.6 | 9.3 | 80 | 76 | 68 | $1.6 \times 10^{-5}$ | SN, MS, F |
|  | 7 | 20.0 | 8.9 | 83 | 78 | 65 | $1.5 \times 10^{-5}$ | SN, MS, F |
|  | 8 | 30.0 | 8.9 | 76 | 71 | 66 | $1.7 \times 10^{-5}$ | SN, MS, F |
| Comparative | 9 | 6.1 | 4.1 | 74 | 64 | 51 | $2.9 \times 10^{-5}$ | SN, MS |
| example | 10 | 20.0 | 4.0 | 72 | 66 | 47 | $3.0 \times 10^{-5}$ | SN, MS |
|  | 11 | 30.0 | 4.0 | 71 | 64 | 48 | $3.4 \times 10^{-5}$ | SN, MS |
|  | 12 | 6.0 | 28.7 | 68 | 42 | 24 | $6.2 \times 10^{-3}$ | SN |
|  | 13 | 20.1 | 21.0 | 70 | 46 | 29 | $1.2 \times 10^{-3}$ | SN |
|  | 14 | 32.2 | 20.1 | 65 | 44 | 27 | $3.4 \times 10^{-3}$ | SN |
|  | 15 | 32.1 | 9.7 | 64 | 46 | 21 | $8.9 \times 10^{-3}$ | SN |
|  | 16 | 32.0 | 3.0 | 58 | 43 | 13 | $5.9 \times 10^{-2}$ | SN, MS |
|  | 17 | 20.0 | 3.0 | 55 | 41 | 10 | $9.0 \times 10^{-2}$ | SN, MS |
|  | 18 | 6.0 | 3.0 | 51 | 43 | 18 | $9.2 \times 10^{-3}$ | SN |
|  | 19 | 6.0 | 11.0 | 48 | 37 | 18 | $8.9 \times 10^{-3}$ | SN |
| Present | 20 | 7.0 | 13.0 | 78 | 68 | 56 | $2.1 \times 10^{-5}$ | SN, F |
| invention | 21 | 16.0 | 15.0 | 75 | 71 | 62 | $2.5 \times 10^{-5}$ | SN, MS, F |
|  | 22 | 30.0 | 14.8 | 77 | 68 | 63 | $1.4 \times 10^{-5}$ | SN, MS, F |
|  | 23 | 7.2 | 5.0 | 75 | 66 | 59 | $3.1 \times 10^{-5}$ | SN, MS |
|  | 24 | 18.0 | 5.0 | 74 | 70 | 60 | $4.0 \times 10^{-5}$ | SN, MS |
|  | 25 | 30.0 | 5.0 | 80 | 69 | 64 | $2.3 \times 10^{-5}$ | SN, MS |

*SN: Si₃N₄ crystal, F: forsterite crystal, MS: magnesium sialon crystal

As shown from the results in Table 1 and FIG. 4, in silicon nitride sintered bodies obtained in the production method of the present invention, at least one crystal of magnesium sialon crystal and forsterite crystal is always formed together with Si₃N₄ crystal, the four point flexural strength at 1,400° C. in air is greater than 55 kg/mm² and the creep rate at 1,200° C. is less than $4 \times 10^{-5}$ hr$^{-1}$. While in the comparative examples, the strength at 1,400° C. is less than 51 kg/mm² and the creep rate at 1,200° C. is greater than $3 \times 10^{-5}$ hr$^{-1}$ and therefore the degradation of the strength at high temperature in the present invention is low and the very excellent properties are obtained. Further, as shown in FIG. 1, the silicon nitride sintered bodies of the present invention do not substantially contain a glass phase in their microstructure. On the contrary, a large amount of glass phase is observed in the microstructure of the sintered bodies having a composition outside the range of the present invention.

It is apparent that even when each of crystalline magnesium sialon and crystalline forsterite is contained alone, satisfactory poperties are developed but when both the crystals are contained, superior strength and creep resistance at high temperatures can be obtained.

EXAMPLE 2

A ratio of x to y (x/y) of magnesium sialon crystal shown by the general formula $Mg_{x/2}Si_{6-y+x/2}Al_{y-x}O_yN_{8-y}$ contained in the sample Nos. 5, 6, 7 and 8 of the present invention in Example 1 was measured and the obtained results are shown in Table 2. The values of Comparative example Nos. 16 and 17 are also shown in Table 2.

TABLE 2

|  | Sample No. | x/y | Strength at 1,400° C. (kg/mm²) |
| --- | --- | --- | --- |
| Present | 5 | 0.96 | 55 |
| invention | 6 | 0.98 | 68 |
|  | 7 | 0.91 | 65 |
|  | 8 | 0.91 | 66 |
| Comparative | 16 | 0.82 | 13 |
| example | 17 | 0.76 | 10 |

As shown in Table 2, when crystalline magnesium sialon having x/y of not less than 0.9 is contained, the four point flexural strength at 1,400° C. is higher than 40 kg/mm² while when x/y is less than 0.9, said strength is less than 20 kg/mm². Thus, it can be confirmed that the sintered bodies wherein x/y of crystalline magnesium sialon is within the limited scope of the present invention of not less than 0.9, have a particularly high strength at high temperatures.

EXAMPLE 3

The same $Si_3N_4$ raw material as used in Example 1 was oxidized by heating it in air under a condition shown in the following Table 3 to adjust its oxygen content to the amount shown in Table 3. The oxidized $Si_3N_4$ raw material was mixed with 18.0% by weight of MgO and 2% by weight of $Al_2O_3$ based on the total amount of $Si_3N_4$, MgO and $Al_2O_3$, and the resulting mixture was mixed, pulverized, dried, shaped and fired in the same manner as described in Example 1. In this experiment, silicon nitride sintered bodies of No. 26 and No. 27 of the present invention were produced from the oxidized $Si_3N_4$ raw materials having an oxygen content of not greater than 2% by weight. The firing was effected at a temperature of 1,750° C. For comparison, comparative sintered bodies of No. 28 and No. 29 were produced from the oxidized $Si_3N_4$ raw materials having an oxygen content of greater than 2.0% by weight. The oxygen content and four point flexural strength at 1,400° C. of the resulting sintered bodies are shown in Table 3. The amount of oxygen contained in 18% by weight of MgO and 2% by weight of $Al_2O_3$ is 7.8% by weight.

As shown in Table 3, when the oxygen content in the resulting sintered body exceeds 2% by weight after subtracting 7.8% by weight of the amount of oxygen contained in the MgO and $Al_2O_3$ from the total oxygen content in the sintered body, the crystallization is insufficient in the sintered body. Therefore, the comparative sintered bodies having an oxygen content of greater than 2% by weight after subtracting 7.8% by weight of the amount of oxygen contained in the MgO and $Al_2O_3$ from the total oxygen content in the sintered body, has a four point flexural strength lower than the four point flexural strength of the sintered bodies of the present invention, which have an oxygen content of not greater than 2.0% by weight after subtracting 7.8% by weight of the amount of oxygen contained in the MgO and $Al_2O_3$ from the total oxygen content in the sintered bodies.

TABLE 3

| | Sample No. | Oxidized $Si_3N_4$ raw material | | Sintered body | |
|---|---|---|---|---|---|
| | | Oxidation condition (°C., hr) | Oxygen content (wt %) | Oxygen content (wt %) | Four point flexural strength at 1,400° C. (kg/mm²) |
| Present invention | 7 | non | 1.4 | 9.3 | 65 |
| | 26 | 700, 2 | 1.7 | 9.5 | 63 |
| | 27 | 700, 6 | 2.0 | 9.7 | 64 |
| Comparative example | 28 | 800, 1 | 2.3 | 9.9 | 48 |
| | 29 | 800, 2 | 3.2 | 10.8 | 26 |

EXAMPLE 4

A $Si_3N_4$ raw material having an oxygen content of 1.2% by weight, a total content of metal impurites of 0.7% by weight, a BET specific surface area of 16 m²/g and an average grain size of 2.0 μm, which was different from the $Si_3N_4$ raw material used in Example 1, was mixed with the same MgO and $Al_2O_3$ as used in Example 1 in a mixing ratio shown in the following Table 4, and the resulting mixture was mixed, pulverized, dried, shaped and fired in the same manner as described in Example 1 to produce silicon nitride sintered bodies of No. 30 and No. 31 of the present invention. In the above experiment, the firing was effected at 1,750° C. Comparative sintered bodies of No. 32 and No. 33, which were not covered within the limited composition area of the present invention, were prepared under the same condition as described above. The four point flexural strengths at room temperature and at 1,400° C. of the resulting sintered bodies are shown in Table 4.

As seen from Tables 1 and 4, the use of different silicon nitride raw materials forms different defects in the resulting sintered bodies, and further forms different defect sizes therein, which defect size has an influence upon the resulting sintered bodies. Therefore, the four point flexural strength level of the silicon nitride sintered bodies of Example 4 shifts from that of the silicon nitride sintered bodies of Example 1. However, in both Example 1 and Example 4, the four point flexural strength of the sintered bodies, which are covered within the limited composition area of the present invention, is distinctly higher than that of the sintered bodies, which are not covered within the limited composition area of the present invention. That is, the strength value of sintered bodies depend upon the defect size of the sintered bodies, but in the same defect size, the strength level of the sintered bodies which are covered within the limited composition area of the present invention, is distinctly higher than that of the sintered bodies, which are not covered within the limited composition area of the present invention.

Further, such a high temperature strength of four point flexural strength at 1,400° C. of a sintered body often decreases due to the creep rupture. In this case, the sintered body has a high temperature strength considerably lower than its room temperature strength. In the sintered body, which is covered within the limited composition area of the present invention, the grain boundary is crystallized and is hardly ruptured by the creep. Therefore, the sintered body has a strength at 1,400° C. of not lower than its room temperature strength. On the contrary, the sintered body, which is not covered within the limited composition area of the present invention, has a strength at 1,400° C. noticeably lower than its room temperature strength.

TABLE 4

| | Sample No. | Mixing ratio (wt %) | | | MgO + $Al_2O_3$ (wt %) | MgO/$Al_2O_3$ (weight ratio) | Four point flexural strength (kg/mm²) | |
|---|---|---|---|---|---|---|---|---|
| | | $Si_3N_4$ | MgO | $Al_2O_3$ | | | Room temperature | 1,400° C. |
| Present inven- | 30 | 84.5 | 14.0 | 1.5 | 15.5 | 9.3 | 48 | 47 |
| | 31 | 80.0 | 18.0 | 2.0 | 20.0 | 9.0 | 45 | 46 |

TABLE 4-continued

| Sample No. | Mixing ratio (wt %) Si₃N₄ | MgO | Al₂O₃ | MgO + Al₂O₃ (wt %) | MgO/Al₂O₃ (weight ratio) | Four point flexural strength (kg/mm²) Room temperature | 1,400° C. |
|---|---|---|---|---|---|---|---|
| tion Comparative example 32 | 80.0 | 16.0 | 4.0 | 20.0 | 4.0 | 45 | 26 |
| 33 | 80.0 | 19.1 | 0.9 | 20.0 | 21.2 | 40 | 22 |

As mentioned above, silicon nitride sintered bodies of the present invention contain the given amount and the given ratio of MgO and Al₂O₃ and at least one of magnesium sialon crystal and forsterite crystal as the second phase, and the amount of glass which is readily formed in the grain boundary of Si₃N₄ crystal is very small, so that the sintered bodies having particularly excellent strength and creep resistance at high temperature can be easily and cheaply produced and these sintered bodies can be utilized for structural materials at high temperature, particularly high temperature gas turbine engine parts, high temperature ball bearings, various high temperature parts and the like, and the industrially commercial value is very high.

On the contrary, in the silicon nitride sintered bodies having a composition outside the range defined in the present invention, for example, in the silicon nitride sintered bodies disclosed by O. de Pous and containing Al₂O₃ and MgO as shown in FIG. 2, glass phase is not completely crystallized, and hence the silicon nitride sintered bodies contain grain boundary phase, which remains therein in the form of glass phase, in an amount larger than the amount of the grain boundary phase, which remains in the silicon nitride sintered bodies of the present invention, and are inferior in high temperature strength and in creep resistance to the silicon nitride sintered bodies of the present invention.

What is claimed is:

1. Silicon nitride sintered bodies consisting essentially of MgO and Al₂O₃ in a total amount of more than 7% by weight and not more than 30% by weight and in a weight ratio of MgO/Al₂O₃ of 5-15, and silicon nitride having an oxygen content of not greater than 2% by weight, said oxygen content being exclusive of the amount of oxygen contained in the MgO and in the Al₂O₃, wherein crystals in the sintered bodies consist essentially of Si₃N₄ crystals and at least one crystalline species selected from the group consisting of magnesium sialon represented by the general formula

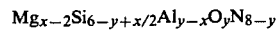

$$Mg_{x-2}Si_{6-y+x/2}Al_{y-x}O_yN_{8-y}$$

wherein $0<x<y<8$ and forsterite represented by the formula $Mg_2SiO_4$ as a second phase, wherein a ratio of x to y (x/y) in the general formula of magnesium sialon crystal is equal to or greater than 0.9 but less than 1, and substantially no glass is present at boundaries between the crystalline species.

2. Silicon nitride sintered bodies as claimed in claim 1, wherein said sintered bodies have a relative density of more than 95%, and a four point flexural strength at 1,400° C. in air of higher than 55 kg/mm².

3. A method for producing silicon nitride sintered bodies, comprising mixing a raw material powder of silicon nitride containing not greater than 2% by weight of oxygen with MgO and Al₂O₃ so that a total amount of MgO and Al₂O₃ is from 7% by weight to 30% by weight and a weight ratio of MgO/Al₂O₃ is 5-15, pulverizing said mixture under conditions whereby oxidation of the silicon nitride is substantially prevented, and firing the resulting mixture at a temperature of 1,650°-1,850° C. in nitrogen or in an inert gas atmosphere under substantially atmospheric pressure to result in a silicon nitride sintered body having substantially no glass present at grain boundaries therein.

4. The method as claimed in claim 3, wherein the raw material powder of silicon nitride has a content of metal impurities of less than 1% by weight, a content of α-Si₃N₄ crystals being not less than 80% by weight, a BET specific surface area of 2-50 m²/g and an average grain size of not greater than 5 μm.

* * * * *